2 Sheets—Sheet 1.
J. BRADY.
Machine for Measuring and Marking Fabrics.
No. 209,647. Patented Nov. 5, 1878.
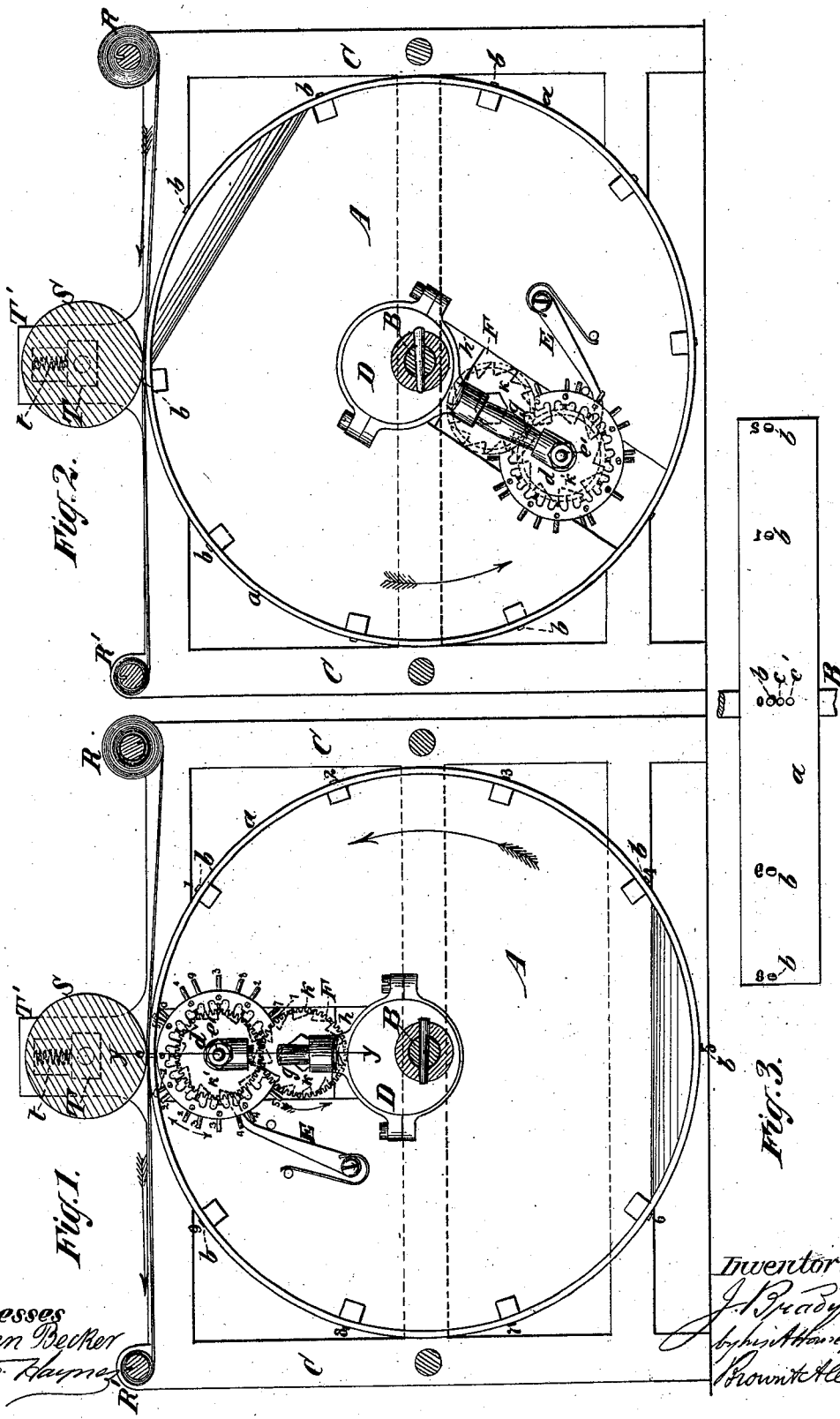
Witnesses
John Becker
Fred Haynes
Inventor:
J. Brady
by his Attorneys
Brown & Allen 2 Sheets—Sheet 2.
J. BRADY.
Machine for Measuring and Marking Fabrics.
No. 209,647. Patented Nov. 5, 1878.
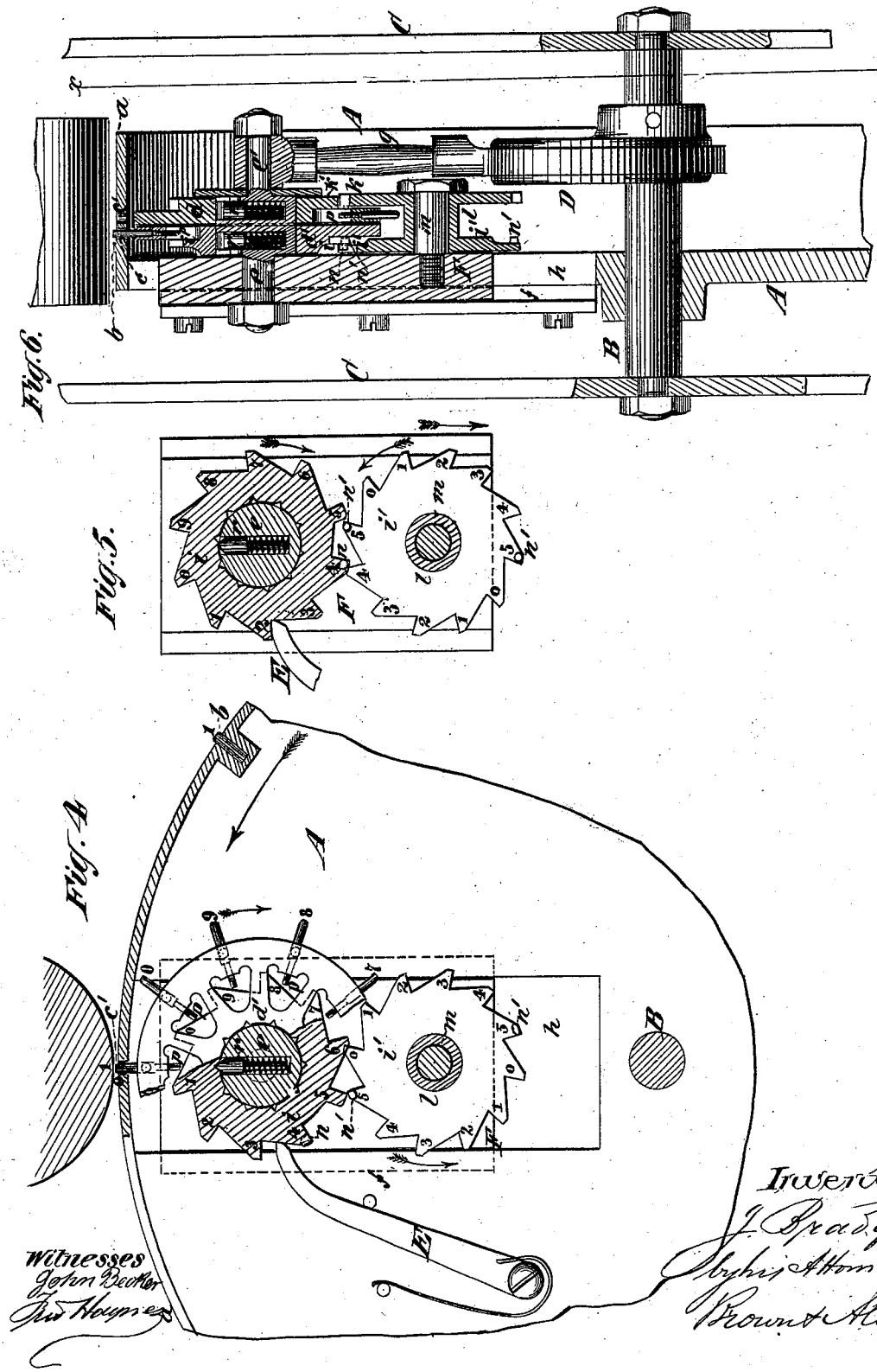

UNITED STATES PATENT OFFICE.

JAMES BRADY, OF BROOKLYN, NEW YORK.

IMPROVEMENT IN MACHINES FOR MEASURING AND MARKING FABRICS.

Specification forming part of Letters Patent No. 209,647, dated November 5, 1878; application filed August 16, 1877.

*To all whom it may concern:*

Be it known that I, JAMES BRADY, of Brooklyn, in the county of Kings and State of New York, have invented an Improvement in Machines for Measuring and Marking Fabrics; and I do hereby declare that the following is a full, clear, and exact description of the same, reference being had to the accompanying drawings, forming part of this specification.

My invention is more particularly applicable to measuring and inscribing measurements upon flexible materials, such as cloth, leather belting, ribbons, paper, &c.; but it may be applied to measuring and inscribing measurements upon strips of inflexible materials, such as strips of wood or metal.

The inscriptions indicative of the measurements may be made (according to various commercial requirements) by stamping or embossing words, abbreviations, numerals; or other marks or characters in or on the substance of the article measured, as would be preferable for belting and some other articles, or by printing such indications with ink upon the article, the ink being either such as may be required for permanent indications or such as may be easily rubbed or washed away, which would be preferable for muslins or prints.

When goods are of such character that they would be damaged by any mark whatever printed upon their margins, the measurements may be imprinted upon strips of paper, which are wound with the goods into rolls.

The advantages obtained by such measurements are that when goods are so marked (the indications of the measurement increasing from the inner end of the piece in the roll to the outer end) exact portions may be cut from the same without further and special measurement, inventories may be made without measuring pieces or remnants, and disputes arising from claims of purchasers for drawbacks, based upon assertions that pieces of goods bought by them do not contain the amount named in their invoices, will be prevented, which is a great desideratum to wholesale dealers in piece goods. A still further benefit is that greater accuracy of measurement is obtainable by machinery than by hand measurement; and my invention may be advantageously applied to the manufacture of tape-lines or rules.

Figure 1 in the drawings is a vertical section made on the line $xx$ in Fig. 6. Fig. 2 is a vertical section made on the same line, but showing the measuring-wheel and its attached parts in a different position from that shown in Fig. 1. Fig. 3 is a top view of the measuring-wheel. Figs. 4 and 5 are sectional details, showing a part of the rear type-wheel, and also two ratchet-wheels. Fig. 6 is a partial vertical section of the machine made on the line $yy$ in Fig. 1, and a partial side view, with portions of the frame broken away to show certain details of construction.

A, Figs. 1, 2, 3, 4, and 6, represents the measuring-wheel, which is preferably made of cast metal in the form of a disk, having an outer rim, $a$, projecting from one side of and at right angles with said disk. The circumference of the said rim is turned or fitted accurately to equal any unit of linear measurement or some multiple of such a unit. Said circumference may be, when a unit, divided into parts representing fractions of the unit of measurement; or, in case the circumference is a multiple of a unit, said circumference may be divided into parts representing the units of measurement, and the parts representing units may be divided into parts representing fractions of such units, the divisions into parts so made being generally such as are ordinarily employed in the measurement of the articles to be measured by the machine.

At the extremities of the parts of the circumference, which represent measurements desired to be inscribed upon the article measured, are formed in or on, attached to or inserted in, the said rim fixed types $b$ of numerals or other marks, which distinguish the divisions and indicate their integral or fractional values.

If numerals are employed, the said numerals may number from zero up to nine, or to any other number desired; but if divisions of the circumference into tenths is only desired, only the zero and nine numerals, in regular succession, are needed. The types $b$ are numbered in the drawings to indicate such a division; but intermediate types may be inserted to indicate fractions.

By the side of the zero-type holes $c\ c'$ are formed, which permit the protrusion of auxiliary movable types, which may be carried by type-wheels, hereinafter described, the number of such holes depending upon the required capacity of the machine. Said measuring-wheel revolves upon a suitable shaft, B, which, according to one method of carrying out my invention, is rigidly attached to the frame C, which supports all the moving parts of the machine.

In case the said shaft is rigidly attached to the said frame, the eccentric D is rigidly attached to the shaft B; but in another mode of carrying out the invention the measuring-wheel A may be keyed to the said shaft B, and the said shaft may revolve in bearings formed in or on or attached to the frame C. In this case the said eccentric D is fitted to allow the shaft B to turn easily in the eccentric, while the eccentric is held from turning on the shaft by attaching it to the frame of the machine. In either case the said eccentric must not revolve, but must be held in fixed relation with the frame of the machine.

The measuring-wheel A carries a spring-pawl, E, which, in conjunction with the eccentric D, causes the rotation of the type-wheels $d$ and $d'$ through the aid of intermediate mechanism hereinafter described.

In a machine having a measuring capacity such as is represented in the drawings only two such type-wheels are needed to indicate even tens up to five hundred, which is the measuring limit of the machine represented, the unit of measurement being one foot and the circumference of the measuring-wheel being ten feet; but the same number of type-wheels may be made to indicate upon the article measured all numbers between ten and the number nine hundred and ninety by a slight modification in the number and position of the types in said type-wheels; and by the addition of other type-wheels the capacity of the machine is increased tenfold for each wheel added, provided the types in said wheels are properly selected and arranged. It will thus be seen that the capacity of the machine is capable of indefinite increase by the addition of type-wheels.

The type-wheel $d'$ may be called the "tens-wheel," units being indicated by the fixed types $b$ on the measuring-wheel A. Said type-wheel $d'$ carries ten types, for imprinting the figures 0 1 2 3 4 5 6 7 8 9, or their equivalent words or characters, arranged in order as named.

The type-wheel $d$ may be called the "hundreds-wheel," and it might carry types of the same numerals or characters as are carried by the tens-wheel, except the zero, which would be represented by an unoccupied space, in which case the capacity of the machine would be nine hundred and ninety-nine of the measuring-units, (feet in this instance;) or the said hundreds-wheel may be supplied with two sets of types, each representing the numerals 1 2 3 4 5, and separated by intervening unoccupied type-spaces twice as wide as any of those between 1 and 5, which is the form shown in the drawing, the capacity of the machine represented being five hundred feet; or the said type-wheel may carry any other number of sets of figures more or less than five, with intervening unoccupied type-spaces, each of which unoccupied spaces will enable the wheel to perform a function hereinafter set forth.

The said types on the said type-wheels are represented in the drawings by the numerals they are designed to impress or inscribe in or on the material to be measured; and the blank type-spaces on the hundreds-wheel $d$ are shown between the types 1 and 5, which blank type-spaces are twice as wide as the spaces between the other types carried by the same wheel.

Both of the type-wheels $d$ $d'$ rotate intermittently on a stud, $e$, which projects from a sliding carriage, F. Said stud $e$ is made larger in the middle than at the ends, such larger portion forming a bearing for the said type-wheels. The said stud has, moreover, a bearing, $e'$, formed thereon for the eccentric-rod $g$, which connects it with the eccentric D.

Said sliding carriage F slides in or on ways $f$, Figs. 4 and 6, formed in or on or attached to the sides of a parallel-sided slot, $h$, in the disk of the measuring-wheel A, and, besides carrying the type-wheels, it carries the ratchet-wheel $i$ and toothed wheel $i'$, Figs. 4, 5, and 6.

The ratchet-wheel $i$ is attached rigidly to or formed on, and as a part of, the type-wheel $d'$, and it has ten teeth, representing the figures 0 1 2 3 4 5 6 7 8 9, corresponding in position with the types which impress those figures or their equivalent upon the material to be measured.

The toothed wheel $i$ is preferably, but not necessarily, made like a ratchet-wheel, and it is attached to the transmitting gear-wheel $k$, Figs. 1 and 6, by a common hub, $l$, Figs. 4, 5, and 6, or in any other suitable manner. The said wheels $i'$ and $k$ rotate intermittingly on the stud $m$, Figs. 4, 5, and 6, which projects from the sliding carriage A.

The gear-wheel $k$ meshes into a gear-wheel, $k'$, Figs. 1, 2, and 6, attached to or formed on the type-wheel $d$, the said gear-wheel $k'$ having the same number of teeth as the gear-wheel $k$. The teeth of the ratchet-wheel $i$ overlap the toothed wheel $i'$, and the said ratchet-wheel has, on the side of its tooth numbered 4, a projection, $n$, which engages one of the teeth of the toothed wheel $i'$, and impels said toothed wheel along one tooth for each revolution of the said ratchet-wheel. The said toothed wheel $i'$ has, on the sides of each of its teeth numbered 5, a projection, $n'$, and whenever the projection $n$ on the ratchet-wheel $i$ has moved the toothed wheel $i'$ by acting upon either of the teeth numbered 4 on said toothed wheel, one or other of the projections $n'$ is brought into engagement with the tooth numbered 5 on the said ratchet-wheel. Consequently the next movement of the ratchet-wheel $i$ will push along the toothed wheel $i'$ still another tooth.

It will now be seen that for every revolution of the ratchet-wheel $i$ and its attached tens type-wheel there will be a movement of the toothed wheel $i'$ through a distance of one tooth till one of the projections $n'$ on said toothed wheel is brought into engagement with the said ratchet-wheel, at which time there will be performed another motion of said toothed wheel through a distance of one tooth while the said ratchet-wheel is making one-tenth of a revolution, and as the motions of said toothed wheel are transmitted through the gears $k\ k'$ to the hundreds-wheel $d$ the latter makes corresponding movements; but it will be seen that any succession of the same series or of different series of numbers or characters on the wheel $d$ may be employed with intervening unoccupied type-spaces, provided that the toothed wheel $i'$ has as many teeth as there are numbers in all the series plus the number of unoccupied type-spaces.

The projection of the types from the type-wheels is adjusted by set-screws $p$, Fig. 4, working in recesses formed in said wheels.

The turning of the type-wheels, except when actuated by the normal motion of the machine, is prevented by wedge-pointed spring-locking pins $r$, Figs. 4 and 6, which are fitted in the stud $e$, and which engage V-shaped recesses formed in the interior bearing-surfaces of said wheels.

The article to be measured, if flexible, is wound upon a delivery-roller, R, which has its bearings on the upper part of the frame C; and the said article is wound off from said roller and rewound on a receiving-roller, R', passing, while being so unwound and rewound, between the measuring-wheel A and an impression-roller, S. Said impression-roller has sliding bearings T, working in slots formed in upward projections T' of the frame C, the lower parts of which slots limit the downward movement of said impression-roller in such manner as to prevent injury to the types. Springs $t$ act upon the sliding bearings T to assist the weight of the roller S in making the impression.

If the numbers representing measurements are to be printed with ink or colors, an inking or color roller will be necessary to ink the types.

The operation of the machine is as follows: The piece of flexible material to be measured is wound upon the roller R. The free end having been placed on the measuring-wheel as exactly as possible at the zero thereon, the said wheel is turned, with the free end of the material still in contact with it, till said free end is passed through between the impression-roller and the measuring-wheel. Thereafter the pulling through of the said material will, by its friction upon the said measuring-wheel, turn said wheel. The free end is then attached to the receiving-roller, to be wound thereon by the use of a winch or other means. During the passage of the material the measuring-wheel turns, and the units-figures are inscribed or stamped by the said measuring-wheel in or on the said material by the fixed types $b$ in the said measuring-wheel, while the tens and hundreds figures are successively brought into proper position, and thrust through the holes $c\ c'$ in the rim of the measuring-wheel at the right time for the impression, and thus the measurements are inscribed on the article as the same is measured.

If desired, a registering apparatus for indicating total measurements may be attached to the machine; but within the limit of the capacity of the machine it is itself a registering apparatus, as the indications of total measurements may be read off from the types from the outside of the rim of the measuring-wheel during a part of the revolution of said wheel after the passage of the types from beneath the impression-roller.

I claim—

1. The combination, with the measuring-wheel in a measuring-machine of a type-wheel arranged to rotate on a shaft revolving around the axis of the measuring-wheel, one or more of the types in which type-wheel are automatically projected from and withdrawn within the surface of the measuring-wheel by the movement of said shaft from and toward the said axis of said measuring-wheel by mechanism substantially as herein described, and for the purpose set forth.

2. The combination, with the measuring-wheel in a measuring-machine and one or more type-wheels arranged upon a reciprocating axis within said measuring-wheel, of mechanism, substantially as herein described, for automatically reciprocating the said axis to project and withdraw the types, substantially as and for the purpose specified.

3. The combination, with a measuring-wheel having openings in its periphery, of one or more internal type-wheels fitted upon reciprocating axles, the type of which wheels are automatically projected from and withdrawn into the said openings by the reciprocation of said axles from and toward the shaft of said measuring-wheel by mechanism substantially as herein set forth, and substantially as and for the purpose herein described.

4. The combination of the measuring-wheel, having in its periphery fixed types and openings for the passage of movable types and one or more type-wheels, the types of which are automatically thrust out through said openings and withdrawn within said openings by mechanism substantially as herein described, and substantially as and for the purpose specified.

5. In a measuring, counting, or registering machine, the combination of the intermittently-rotating driving-wheel $i$, the driven toothed wheel $i'$, the side projection $n$ on the said driving-wheel for moving the said driven wheel through a distance of one tooth at every revolution of the said driving-wheel, and one or more side projections, $n'$, on the said driven wheel, for producing the separation of series of numbers by the movement of the latter wheel at intervals through a distance of two teeth, substantially as and for the purpose specified.

6. The combination, with the measuring-wheel A, having fixed types $b$, and the holes $c\ c'$ in its rim, of the type-wheel $d'$, the ratchet-wheel $i$, the toothed wheel $i'$, the transmitting-gears $k$ and $k'$, the type-wheel $d$, the sliding carriage F, carrying said wheels $d\ d'\ i\ i'\ k\ k'$, the fixed eccentric D, rod $g$, and pawl E, all operating to move the types into position and thrust them through the holes $c\ c'$, substantially as and for the purpose set forth.

JAMES BRADY.

Witnesses:
 FRED. HAYNES,
 BENJAMIN W. HOFFMAN.